United States Patent
Mummareddy et al.

(10) Patent No.: US 7,319,779 B1
(45) Date of Patent: Jan. 15, 2008

(54) CLASSIFICATION OF HUMANS INTO MULTIPLE AGE CATEGORIES FROM DIGITAL IMAGES

(75) Inventors: Satish Mummareddy, State College, PA (US); Rajeev Sharma, State College, PA (US)

(73) Assignee: VideoMining Corporation, State College, PA (US)

( * ) Notice: Subject to any disclaimer, the term of this patent is extended or adjusted under 35 U.S.C. 154(b) by 649 days.

(21) Appl. No.: 11/004,299

(22) Filed: Dec. 3, 2004

Related U.S. Application Data (60) Provisional application No. 60/527,818, filed on Dec. 8, 2003.

(51) Int. Cl.
*G06K 9/00* (2006.01)
(52) U.S. Cl. ............................ 382/118; 382/226
(58) Field of Classification Search ............... 382/100, 382/103, 118, 224, 226
See application file for complete search history.

(56) References Cited

U.S. PATENT DOCUMENTS

| | | | |
|---|---|---|---|
| 5,781,650 | A | 7/1998 | Lobo et al. |
| 5,963,670 | A | 10/1999 | Lipson et al. |
| 2002/0052881 | A1 | 5/2002 | Player |
| 2002/0102024 | A1 | 8/2002 | Jones et al. |
| 2003/0164878 | A1* | 9/2003 | Iizaka ..................... 348/169 |
| 2006/0045352 | A1* | 3/2006 | Gallagher ............... 382/224 |

OTHER PUBLICATIONS

U.S. Appl. No. 60/421,717, filed Oct. 28, 2002, Sharma et al.

Young H. Kwon and Niels da Vitoria Lobo, "Age Classification from Facial Images", Computer Vision and Image Understanding vol. 74, No. 1, Apr. pp. 1-21, 1999.

Gregory Shakhnarovich, Paul Viola, and Baback Viola, "A Unified Learning Framework for Real Time Face Detection & Classification", International Conference on Automatic Face and Gesture Recognition, May 2002.

Andreas Lanitis, Chris J. Taylor and Timothy F. Cootes, "Towards Automatic Simulation of Aging Effects on Face Images", IEEE Transaction on Pattern Analysis and Machine Intelligence, vol. 24, No. 4, Apr. 2002.

In D. Micheal Burt, and David. I. Perrett, "Perception of age in adult Caucasian male faces: computer graphic manipulation of shape and colour information", Proceedings of the Royal Society of London, vol. 259, pp. 137-143, 1995.

(Continued)

*Primary Examiner*—Andrew W. Johns (57) ABSTRACT

The present invention includes a method and system for automatically extracting the multi-class age category information of a person from digital images. The system detects the face of the person(s) in an image, extracts features from the face(s), and then classifies into one of the multiple age categories. Using appearance information from the entire face gives better results as compared to currently known techniques. Moreover, the described technique can be used to extract age category information in more robust manner than currently known methods, in environments with a high degree of variability in illumination, pose and presence of occlusion. Besides use as an automated data collection system wherein given the necessary facial information as the data, the age category of the person is determined automatically, the method could also be used for targeting certain age-groups in advertisements, surveillance, human computer interaction, security enhancements and immersive computer games.

13 Claims, 7 Drawing Sheets

OTHER PUBLICATIONS

Henry A. Rowley, Shumeet Baluja, and Takeo Kanade, "Neural Network-Based Face Detection", IEEE Transactions on Pattern Analysis and Machine Intelligence, vol. 20, No. 1, pp. 23-28, Jan. 1998.

C. Burges, "A tutorial on support vector machines for pattern recognition, data mining and knowledge discovery", vol. 2, pp. 121-167, 1998.

Shree K. Nayar, Hiroshi Murase, Sameer A. Nene, "Parametric Appearance Representation", Chapter 6 in Early Visual Learning, Edited by Nayar and Poggio. Oxford University Press, 1996.

D. D. Lee and H. S. Seung, "Learning the parts of objects by non-negative matrix factorization," Nature, vol. 401, pp. 788-791, 1999.

* cited by examiner

CLASSIFICATION OF HUMANS INTO MULTIPLE AGE CATEGORIES FROM DIGITAL IMAGES

CROSS-REFERENCE TO RELATED APPLICATIONS

This application is entitled to the benefit of Provisional Patent Application Ser. No. 60/527,818, filed Dec. 8, 2003.

FEDERALLY SPONSORED RESEARCH

Not Applicable

SEQUENCE LISTING OR PROGRAM

Not Applicable

BACKGROUND OF THE INVENTION

1. Field of the Invention

This invention relates to the use of pattern recognition methodologies for developing a system for automatic categorization of a person from his/her image into a particular age category.

2. Background of the Invention

Age Classification has numerous applications and has the potential of not only enhancing the existing HCI system but can also serve as platform for passive surveillance (for e.g., alerting medical authorities if there is an accident in old age home). It can also be used for development of new HCI application (e.g., cigarette vending machines based on age verification), immersive computer games (for e.g., changing scenarios and multimedia content based on age category preferences), collecting retail business information (e.g., the number of children entering a retail store on a given day), image retrieval (for e.g., accessing all images belonging to babies), enhancing identity verification, and advertising (for e.g., focusing on a particular age group for selling a product).

To date there has been only two attempt to classify a person in an age category just from the facial information. U.S. Pat. No. 5,781,650 to De Lobo describes an automatic feature detection and age classification method for human face in images. Their automatic age categorization system is based on finding a face in an image and locating the facial features such as nose, eyes, mouth, top of the head and chin. These features were then used to determine different T ratios (transverse ratios of distance between eyes to the distance between line connecting the eyes from the nose/chin/top of head) that were then used for classification purposes. In the paper titled "Age Classification for Facial Images" by the same inventors Young H. Kwon and Niels De Vitoria Lobo, Computer Vision and Image Understanding, 74(1), pp. 1-21, 1991, they described their above patented method based on cranio-facial development theory and wrinkle analysis for age classification. In their invention, they did not use direct appearance information available from a face image to classify, instead they used geometric ratios obtained from the position of the facial features and presence of wrinkles.

Patent Application No. 60/421,717 by R. Sharma, M. Yeasin, and R. Khare uses direct appearance information for classifying humans into two age categories. Appearance information is used to extract discriminating features and these features used to train a bank of classifiers to derive the binary age class of the person. They do not have a method for dividing people in more than two classes (multiple classes) from appearance-based information.

Patent granted to Michael J. Jones, U.S. Pat No. (Application) US20020102024A1, describes a method for object detection using integral image representation of the input image. The object detector uses a cascade of homogenous classification functions or classifiers. Their invention defines a fast method for object detection using rectangular components defined by wavelets. The research paper titled "A Unified Learning Framework for Real Time Face Detection & Classification", Gregory Shakhnarovich, Michael J. Jones, and Baback Moghaddam, International Conference on Automatic Face and Gesture Recognition, 2002, performed gender and ethnicity classification using integral image. It calculates the integral image rather than classifying on basis of the face appearance. Furthermore, their system does not perform age classification.

U.S. Pat. No. 5,963,670 to P. R. Lipson et. al., describes a method for classifying and detecting objects in images using a class model based on global deformable templates. This method is based on building a class model in terms of a deformable template and cannot be applied for age classification.

In Andreas Lanitis, Chris J. Taylor and Timothy F. Cootes, "Towards Automatic Simulation of Aging Effects on Face Images", IEEE Transaction on Pattern Analysis and Machine Intelligence, Vol. 24, No. 4, April 2002, some work has been done in the field of simulating aging in facial images. In that paper the main aim was to make face recognition robust with respect to aging variations. Thus given the face of a person the face is "age normalized" before being used in face recognition. This method can be used for simulating ageing effects but does not address age classification.

In D. Micheal Burt, and David. I. Perrett, "Perception of age in adult Caucasian male faces: computer graphic manipulation of shape and colour information", Proceedings of the Royal Society of London, Vol. 259, pp 137-143, 1995, a study was performed on the correlation between the perceived age and the chronological age. Though this study provides an insight into the ageing process, it does not deal with age classification of digital face images.

Patent granted to Player, U.S. Pat No. (Application) US20020052881A1, shows an example of use of demographic information for customizing computer games and advertising. They did not show any method or system for extracting demographic information from images or videos.

SUMMARY

This invention deals with the classification of people from their facial images into one of multiple age categories.

The method according to this invention, comprise of a face detector module for identifying the faces within a digital image. The output of the face detector module is fed to a feature extraction module. The feature extraction module comprises of means for processing the face region to extract discriminating features by algebraic manipulation. These features are fed to the classification module to extract age category information.

The classifier module comprises a set of binary classification systems that are logically arranged in a tree structure to determine the age category of the person. Each binary classification system at a node (parent classifier) determines whether a person belongs to one of the two intermediate age classes. Based on the decision of the parent binary classification system the person is then classified by one of the children binary classification systems and so on until the person is classified as belonging to a particular end age category ie. reaches the leaves of the tree structure. Each binary classification system can comprise of one or more classifiers that can work in serial or parallel or a combination to determine the intermediate binary age category for the person. Each classifier can make use of any known pattern recognition technique and be trained on a different set of features.

The multiple age categories can be any partitioning of the age spectrum into desired number of groups.

The system consists of a set of visual sensors interfaced with a set of processing units as the hardware. The digital images captured by the visual sensors are analyzed by software module explained above that decides the age category of the person.

DRAWINGS

Figures

DETAILED DESCRIPTION OF THE INVENTION

Figure 1:
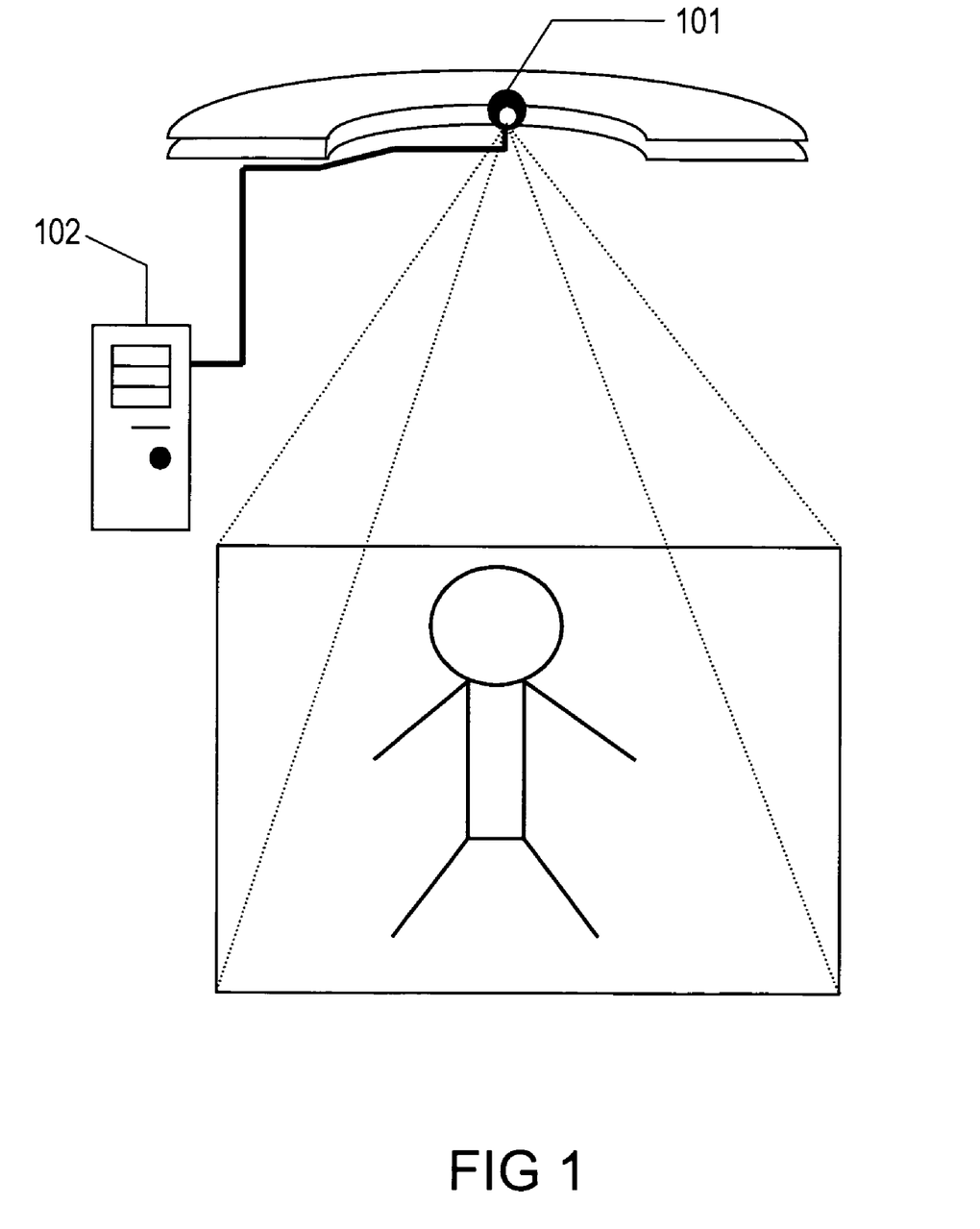
FIG. 1—Age Classifier system overview

An exemplary setup of the invention is now described in detail. The present invention detects the faces in the current scene and decides the age category of the persons. FIG. 1 shows an exemplary hardware setup for the present invention. The hardware components of the system consist of an image capture device 101 and a processing unit 102.

Figure 2:
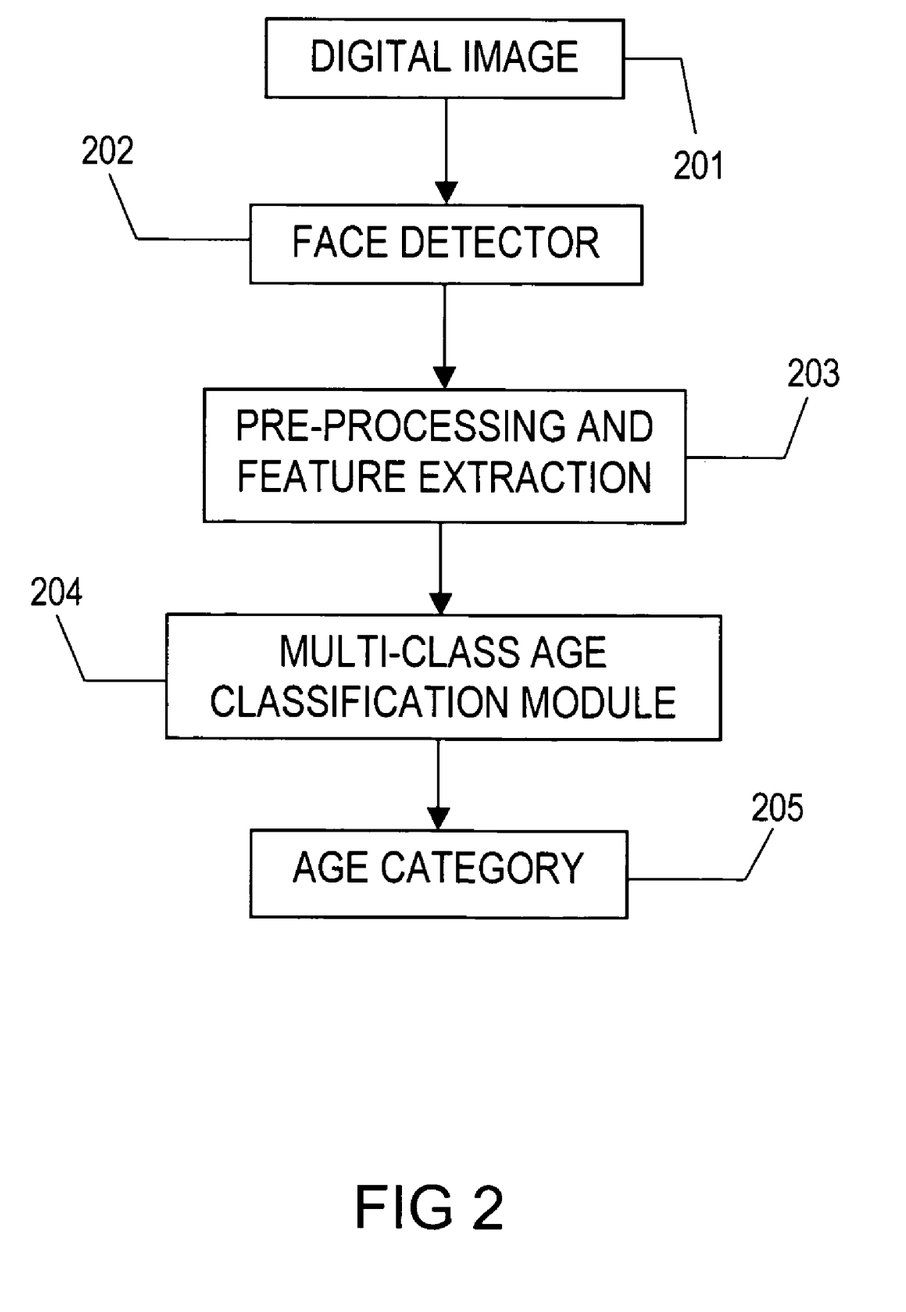
FIG. 2—Block diagram of the age classifier system

In this exemplary embodiment shown in FIG. 1, a single firewire camera, such as the Pyro 1394 web cam by ADS technologies or iBOT FireWire Desktop Video Camera by OrangeMicro, or a USB camera, such as the QuickCam Pro 3000 by Logitech may be used as the image capture device 101. A computer system, such as the Dell Precision 420, with processors, such as the dual Pentium 864 Mhz microprocessors, and with memory, such as the Samsung 512 MB DRAM, may be used as the processing unit 102 in the exemplary embodiment. The processing software may be written in a high level programming language, such as C++ could be used in the exemplary embodiment. FIG. 2 shows the block diagram consisting of the main blocks used in the age category classification system.

An exemplary system is first fed the digital image 201 of the person as captured by the image capture device 101. The area of interest is cropped out from the scene by the face detector 202. The face detector algorithm as implemented in Henry A. Rowley, Shumeet Baluja, and Takeo Kanade, "Neural Network-Based Face Detection", IEEE Transactions on Pattern Analysis and Machine Intelligence, volume 20, number 1, pages 23-38, January 1998, could be used in the face detector 202.

The output of the face detector 202 is a rectangular window containing the face of the person. Before the image is fed to the classifier, the image is passed through a pre-processing and feature extraction 203 process. Image processing algorithms such as histogram equalization and brightness gradient removal could be applied in order to present images of uniform brightness to the classifier. The brightness gradient removal algorithm consists of a method to remove any gradual changes of lighting across an image. Principal component analysis as explained in, Shree K. Nayar, Hiroshi Murase, Sameer A. Nene, "Parametric Appearance Representation", Chapter 6 in Early Visual Learning, Edited by Nayar and Poggio. Oxford University Press, 1996, and non-negative matrix factorization as explained in D. D. Lee and H. S. Seung, "Learning the parts of objects by non-negative matrix factorization," Nature, vol. 401, pp. 788-791, 1999 etc., could be used. This representation of the image is finally fed to the multi-class age classification module 204 that decides the multi-class age category 205 of the person.

Figure 4:
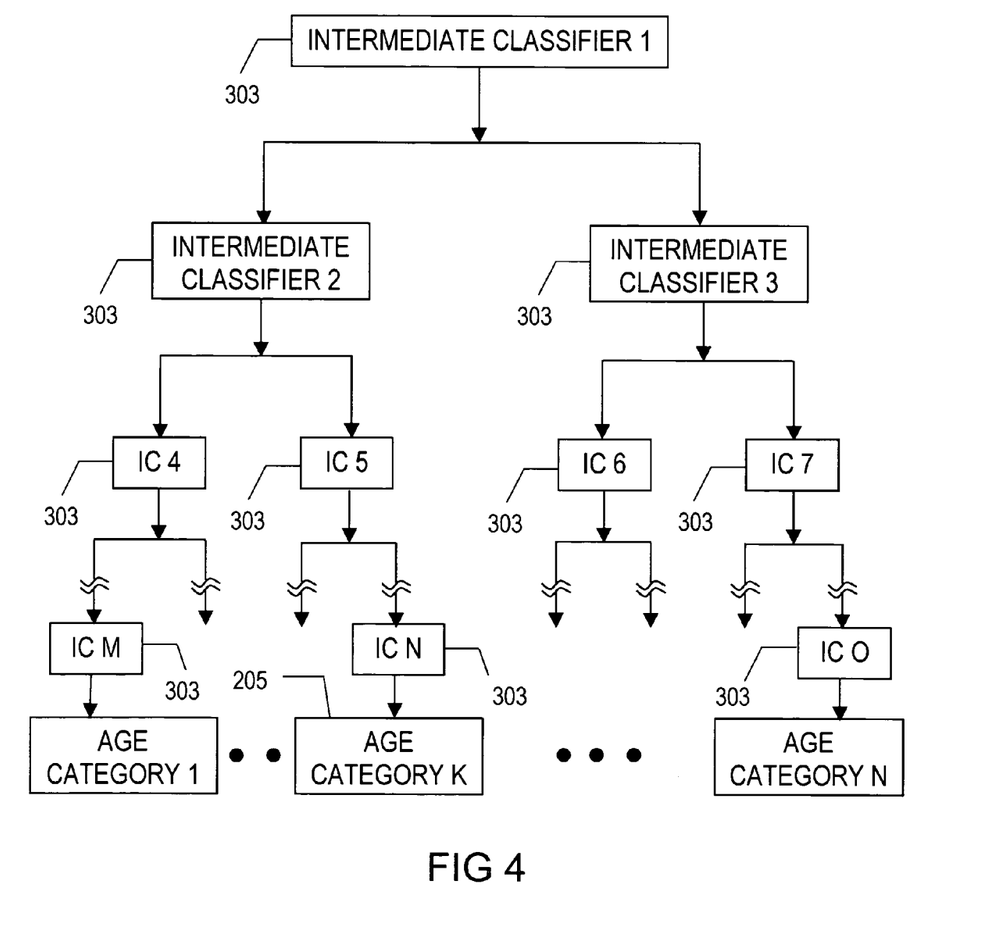
FIG. 4—Tree architecture for multi-class age classification module

FIG. 4 shows the tree structure for the multi-class age classification using a set of binary age classifiers. The multi-class age classification module 204 comprises a set of Intermediate Classifiers 303, that are logically arranged in a tree structure to determine the age category of the person. Each Intermediate classifier 303 at a node (parent classifier) determines whether a person belongs to one of the two intermediate age classes 302. Based on the decision of the parent binary classification system the person is then classified by one of the children Intermediate Classifiers 303 and so on until the person is classified as belonging to a particular end age category 205 ie. reaches the leaves of the tree structure.

Figure 3:
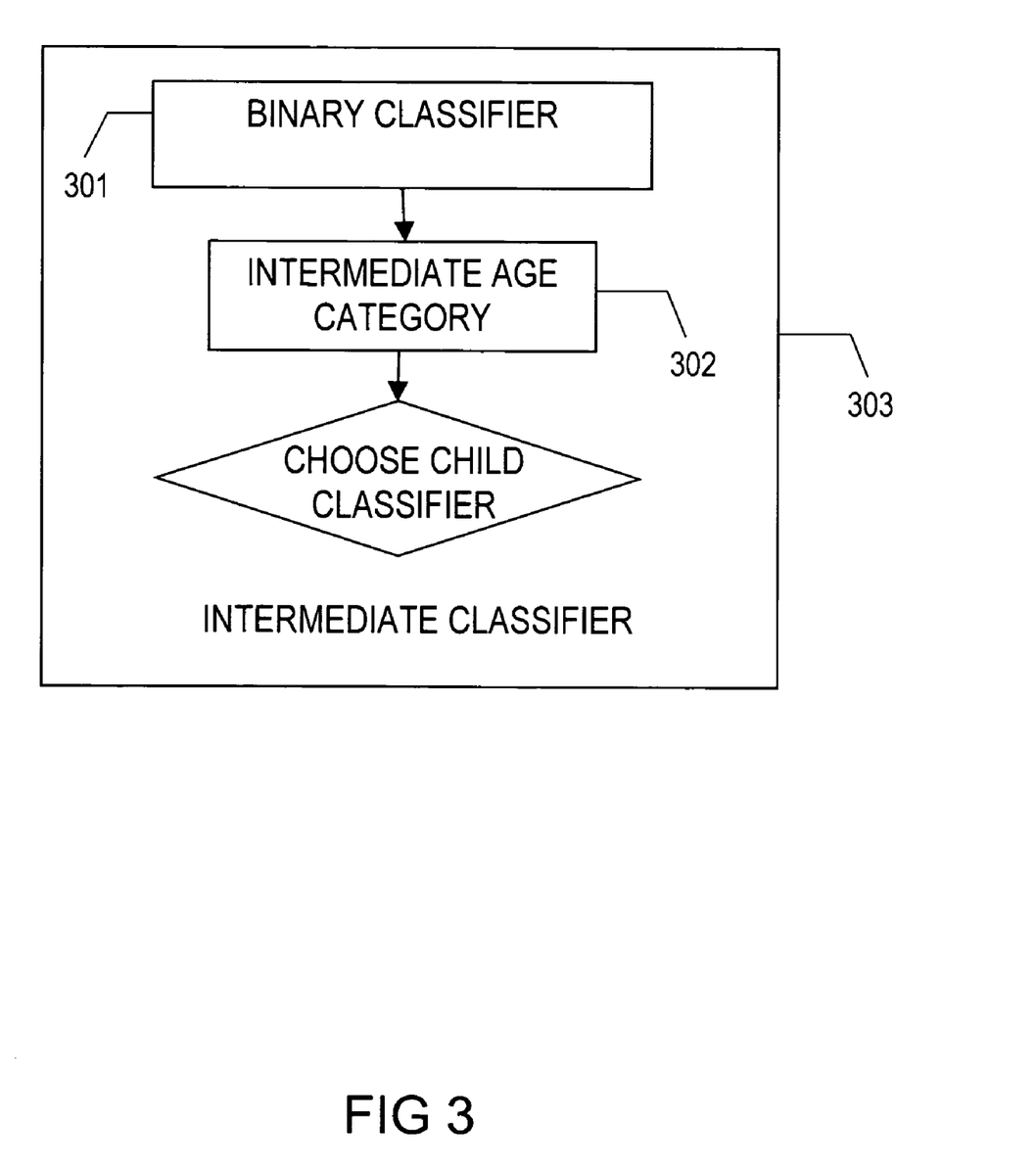
FIG. 3—Intermediate Classifier

FIG. 3 shows an Intermediate Classifier. Each Intermediate Classifier comprises a binary classifier 301. Each binary classifier 301 can comprise of one or more classifiers that can work in serial or parallel or a combination to determine the intermediate binary age category for the person. The tree structure chosen is dependent on the classes that are part of the multi-class output. All the parents in the tree need not have two children.

For example, a classifier module that determines whether a person belongs to one of three age categories (child, young adult, and senior) can consist of two binary classification systems; the first one determines whether the person belongs to the child category or not, and the second classification system determines if the person is a young adult or a senior. When a person needs to be classified the first classification system determines if the person belongs to the child category. If he belongs to the child category then the classification module gives child class as the output, else the second classification module determines whether the person is a young adult or a senior. The output of the second classification system then is the output of the multi-class age classification module. The same multi-class classification could also have been performed by using two binary classifiers where, the first one determined whether a person belonged to the senior category or not, and then if the person did not belong to the senior class then the second classifier would determine whether the person belonged to the child or young adult category.

Figure 5:
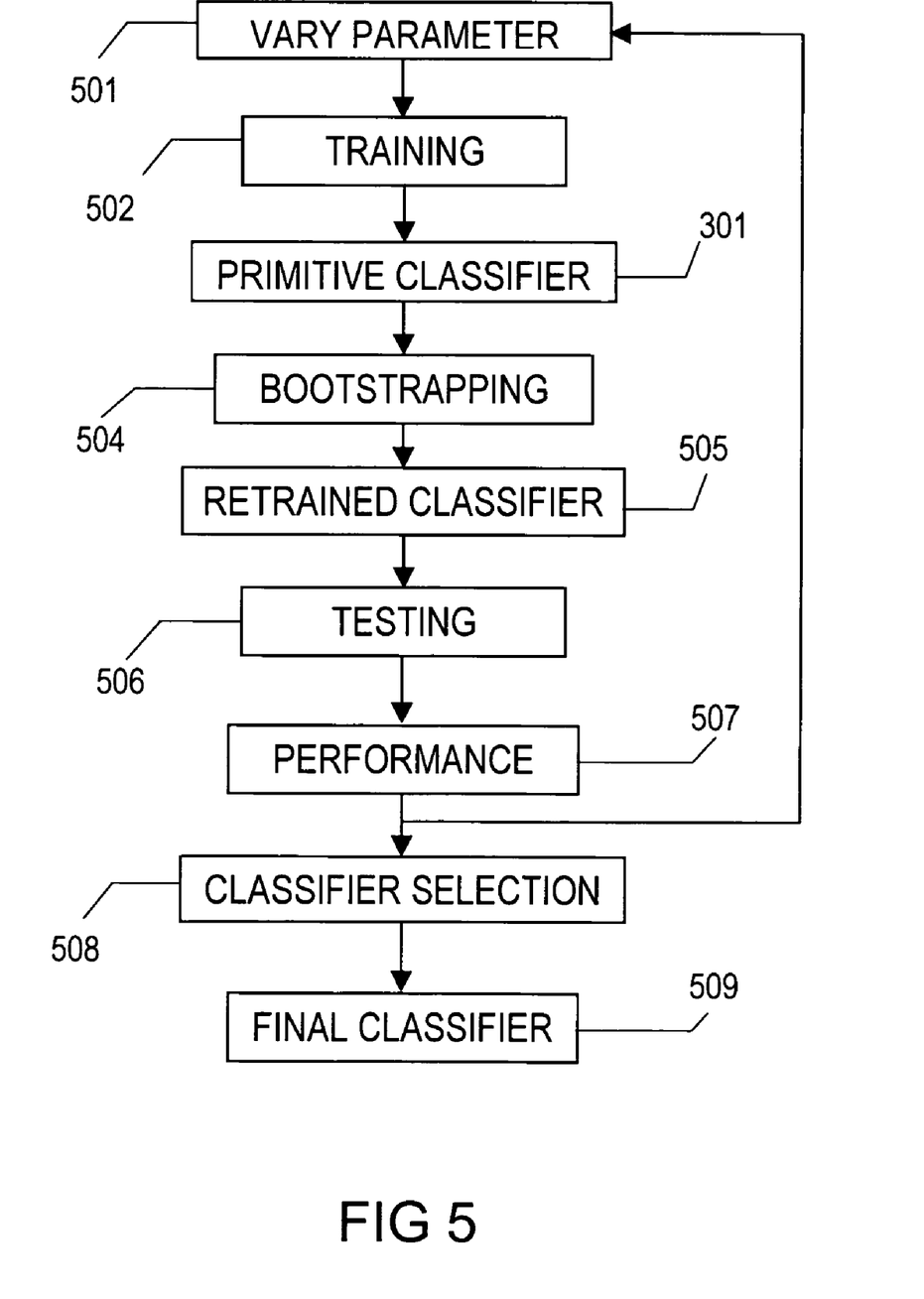
FIG. 5—Block diagram for training a binary classifier

FIG. 5 describes the steps in an exemplary case that could be followed for creating an accurate and generalized binary classifier. In data collection facial images of people of different age groups were collected. All these images were appropriately labeled with the age category of the person in the image. These labels were used as ground truths to be used during the training 501 of the classifiers 502. This data set was divided into three parts—the training set, the bootstrapping set and the testing set all of them mutually disjoint. Histogram equalization and brightness gradient removal were used as part of the preprocessing for all the images in order to get rid of all brightness information that might affect the performance of the classifiers. Principal component analysis performed as a feature extraction. Different feature extraction methods can be used to generate different classifiers, for example the gray-scale value of the image pixels, and non-negative matrix factorization. Besides increasing accuracy by removing very specific information about the images the feature extraction method also improves the computational speed of the classifier that is an important criteria for a real time classifier system.

The classifier 502 can be any pattern recognition algorithm. In this example support vector machines, C. Burges, "A tutorial on support vector machines for pattern recognition, data mining and knowledge discovery", vol. 2, pp. 121-167, 1998, can be used.

For the exemplary system, the collected data was divided into training data, bootstrapping data and test data. The classifier is trained 502 on the training data to create the primitive classifier 503. Then bootstrapping 504 is performed on the primitive classifier 503. Bootstrapping 504 involves (i) testing the primitive classifier 503 on the bootstrapping data, (ii) separating out the misclassified data from the bootstrapping data, (iii) adding a fraction of the misclassified data to the training data, and (iv) training again to obtain the retrained classifier 505. The classifier performance 507 is determined by testing 506 the retrained classifier 505 on the test data. The above procedure is repeated for different values of parameters 501 to determine the retrained classifier for each set of parameter values. Classifier selection 508 is done by choosing the retrained classifier 505 with the best performance as the final classifier 509.

Figure 6:
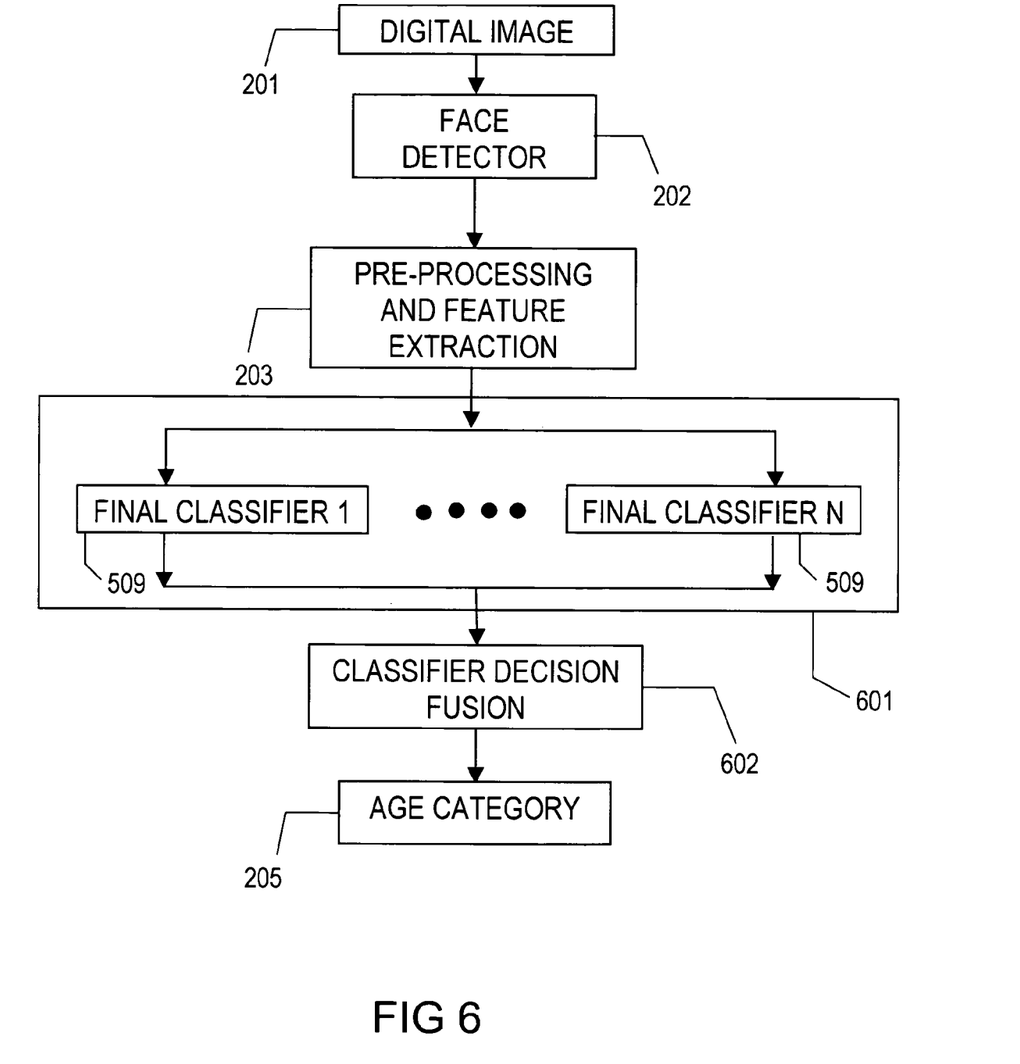
FIG. 6—Block diagram for the parallel paradigm for classification
Figure 7:
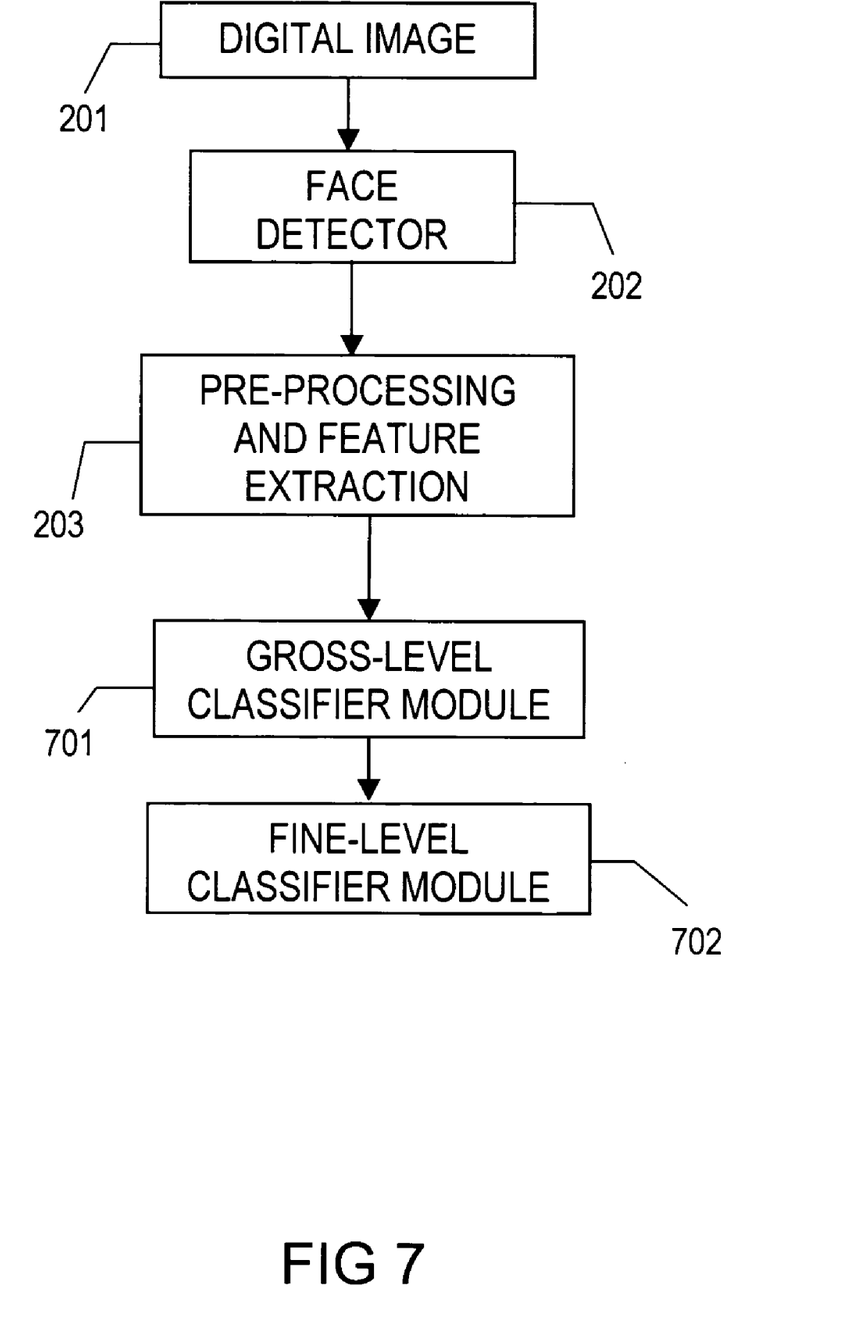
FIG. 7—Block diagram for the serial paradigm for classification

In order to improve the efficacy of the classifier either the parallel or the serial or a combination of the two paradigms could be used. The parallel paradigm as indicated in FIG. 6 is based on the fact that examples misclassified by one classifier could be classified correctly by another thus giving a better overall accuracy if both the classifiers are used. The final classifiers 509 used in the bank of parallel classifiers 601 can vary either in the type of parameters used in the classifier or the type of feature extraction used for them. They could also differ in the type of classifiers used. Classifier decision fusion 602 is performed on the outputs of the final classifiers 509 in the bank of parallel classifiers 601 to obtain the age category 205. Another case of serial paradigm of classification could be one in which the first few stages of classifiers could be used as gross-level classifiers 701 followed by more fine-level classifiers 702 as indicated in FIG. 7. Using the parallel and the serial paradigm simultaneously would give the best possible performance.

A particular exemplary case of age category classification could be a binary age category classifier using the serial paradigm for classification. In this example, the image from the camera is fed to the face detector software to detect the face in it. This face is then resized to the desired size and histogram equalization and brightness gradient removal is carried out on the image. Following the image processing the image is passed through a feature detector having a set of 100 basis vectors obtained from the training images thus giving a feature vector with 100 values. This is then fed to an age classifier. The final output of the age classifier gives the age category of the person as belonging either to the adult age category or the minor age category.

We claim:

1. A method for extracting the multi-class age category information of a person from his or her facial image comprising the steps of;
   a) acquiring a digital image,
   b) applying a face extraction process to extract a face region of said person from said digital image,
   c) processing said face region to extract face features, and
   d) processing said face features obtained from said face region using a tree of binary classification systems to determine the multi-class age category,
   whereby said face region is the collection of digital image pixels that encompass the face of said person in said digital image,
   whereby said face features are a representation of said face region as direct pixel information or any representations obtained by transformation into other spaces by algebraic manipulation, and
   whereby the multi-class age categories can be any partition of the entire age spectrum into any number of groups.

2. The method according to claim 1, wherein the step of processing said face region to extract said face features further comprises steps of applying algebraic space transformations, whereby said algebraic space transformations includes one of Principal Component Analysis, Independent Component Analysis, Non-negative Matrix Factorization or gray-scale values of the facial regions.

3. The method according to claim 1, wherein the tree structure for multi-class age classification comprises any number of binary age classifiers organized in the desired order without any restriction on the depth and fullness of the tree.

4. The method according to claim 1, wherein said binary age classification systems each comprises a single or a plurality of classifiers,
   whereby the classifiers can be any pattern classification techniques, and
   whereby said plurality of classifiers differ from each other by any of the processes for extracting said face features, the steps for building a classifier, the training parameters of said classifier, or a combination thereof.

5. The method according to claim 4, wherein said single or plurality of classifiers comprise a combination of two or more steps of
   a. collecting data
   b. training of classifier using cross-validation
   c. bootstrapping to obtain the best classifier, or
   d. testing the classifier.

6. The method according to claim 4, wherein said plurality of classifiers are arranged in serial,
   whereby the arrangement in serial can be any sequential ordering of the plurality of classifiers, and
   whereby the errors from one classifier can be detected by the next classifier in the sequence, thus improving the accuracy of the classification method.

7. The method according to claim 6, wherein the order of the classifiers could be interchanged.

8. The method according to claim 4, wherein said plurality of classifiers are arranged in parallel,
   whereby the errors from one classifier can be detected by the other classifiers in parallel, thus improving the accuracy of the classification method.

9. The method according to claim 4, wherein said plurality of classifiers are arranged in a combination of serial and parallel configurations.

10. A system for extracting the multi-class age category information of a person from his or her facial image comprising;
   a) means for acquiring a digital image,
   b) means for applying a face extraction process to extract a face region of said person from said digital image,
   c) means for processing said face region to extract face features, and
   d) means for processing said face features obtained from said face region using a tree of binary classification systems to determine the multi-class age category.

11. The system according to claim 10, wherein said means for acquiring digital image comprises any digital or analog means for acquiring image,
   whereby said digital or analog device can be a USB camera, a firewire camera, an infrared camera, a thermal imaging device, or any other capturing device.

12. The system according to claim 10, wherein the means for processing face features comprises one or more processing units.

13. The system according to claim 12, wherein said processing units each further comprises one or more microprocessors.

* * * * *